INVENTOR.
JOHN W. ELDRED
BY
Schmielding and Fultz
ATTORNEYS

April 28, 1959    J. W. ELDRED    2,883,797
FIRE FINISHING MACHINE FOR GLASS ARTICLES
Filed March 29, 1955    5 Sheets-Sheet 5

INVENTOR.
JOHN W. ELDRED
BY
*Schmieding and Fultz*
ATTORNEYS

United States Patent Office 2,883,797
Patented Apr. 28, 1959

2,883,797

FIRE FINISHING MACHINE FOR GLASS ARTICLES

John W. Eldred, Columbus, Ohio, assignor, by mesne assignments, to J. & L. Associates, Inc., a corporation of Ohio Application March 29, 1955, Serial No. 497,707

20 Claims. (Cl. 49—7)

The present invention relates generally to the manufacture of glass articles, and more particularly to a machine for continuously fire finishing such articles in steady flow production.

The present invention is particularly useful in the manufacture of commercial tumblers which are used in the food industry for packing food products, and which are subsequently used by the purchaser as drinking glasses. It is essential that the finish or bead of an article of this type be entirely free from incipient chips or cracks in order to prevent spoilage of the food by air leakage. It is also essential that the tumblers be within the size and roundness tolerance in order to eliminate breakage during the mechanical packing operation. Accordingly, the machine of the present invention is adapted to efficiently fire finish, and when required, to accurately perform a resizing operation on the articles.

In order to eliminate any manual handling of the glass articles and to meet the needs of high speed production, the fire finishing machine of the present invention is arranged to operate automatically in complete synchronization with the glass forming machinery, the glass feeding machinery and the glass conveyors.

It is therefore an object of the present invention to provide apparatus of the type described wherein articles of ware are successively presented to a head which includes a novel means for producing a smooth and accurately sized finish in the ware.

It is another object of the present invention to provide a machine of the type described wherein glass articles are automatically deposited in a receiving cup adapted to receive the article and to hold it in the proximity of the firing zone of a novel ring burner. The machine is adapted to produce relative rotation between the burner and the receiving cup and to automatically bring the article into the firing zone of the burner whereby the finish is heated in a uniform and efficient manner.

It is another object of the present invention to provide a machine of the type described wherein articles of ware are successively and automatically placed in receiving means adapted to move the ware into the firing zone of a novel burner. The burner is adapted to produce a firing zone in the form of a vortex of flame which conforms with the article to rapidly and efficiently melt the superficial surface of the glass, thus healing any incipient cracks and at the same time, glazing the surface.

It is another object of the present invention to provide a machine of the type described wherein glass articles are automatically presented to article receiving means located adjacent to a ring burner adapted to apply heat to the finish of the article and wherein the machine is adapted to accommodate a wide range of finish sizes through the use of novel adjusting means for adjusting the size of the vortex of flame produced by the burner and by novel adjusting means for varying the position of the receiving means and article with reference to the heating zone.

It is another object of the present invention to provide apparatus of the type described wherein a novel ring burner is used to apply heat to the finish of an article by means of a vortex of flame which produces a highly uniform heating effect on the article. As a result, the finish is not distorted during fire finishing, and if the ware is formed of sufficient roundness by the forming machine, it is not necessary to reform the ware after fire finishing, thus eliminating the separate reforming operation in many instances.

It is another object of the present invention to provide a machine of the type described wherein glass articles are automatically positioned in receiving cups mounted adjacent to a resizing means adapted to engage the finish of the article. Relative rotation is automatically effected between the article receiving cup and the resizing means and the articles are automatically moved, after heating of the finish thereon, into rotating engagement with the resizing means whereby the glass article is accurately sized in a rapid and efficient manner.

It is another object of the present invention to provide a machine of the type described wherein glass articles are automatically presented to and received by a head adapted to fire finish and resize same. The head includes a novel burner and fuel supplying system adapted to automatically raise and lower the intensity of the heating effect applied to the finish of the article in synchronization with the fire finishing and resizing operations performed on the article by the machine. This arrangement permits the combining of a fire finishing burner and a resizing means in a unitary head since a single article receiving cup serves to present the finish of the ware first to the heating zone of the burner and thence to the article resizing means without the necessity of intermediate indexing or relocating of the article, the burner, or the resizing means.

It is still another object of the present invention to provide a machine of the type described wherein a plurality of article receiving heads are each adapted to successively receive a glass article and perform a sequence of operations thereon whereby the article is fire finished and resized. Although the heads are moved in a circular path from an article receiving station to an article discharging station, the machine is uniquely adapted to permit movement of the heads in either a clockwise or counterclockwise direction. This desirable feature provides flexibility of installation at the glass plant in that the machine may be easily changed from one side of a melting furnace to the other.

Further objects and advantges of the present invention will be apparent from the following description, reference being had to the accompanying drawings wherein a preferred form of embodiment of the invention is clearly shown.

Figure 1:
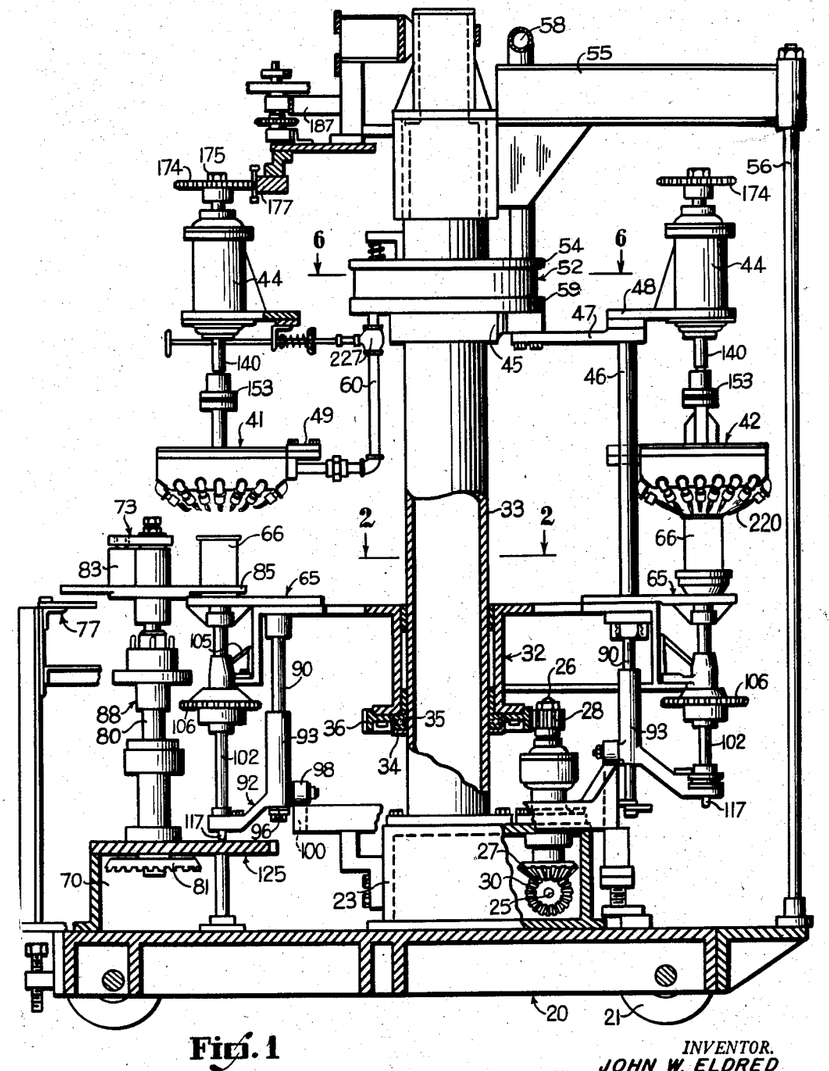
Figure 1 is a side elevational view, partially in section, of the fire finishing machine of the present invention. The section is taken substantially along the line 1—1 of Figure 2.

Referring next to the drawings, Figure 1 illustrates a fire finishing machine constructed according to the present invention. The machine includes a frame 20 supported by wheels 21 which facilitate moving the machine from one plant location to another. Frame 20 supports a housing 23, and the housing 23 rotatably carries a horizontal shaft 25 driven by a suitable prime mover not illustrated. A vertically extending shaft 26 is rotatably supported by the housing 23 and carries a beveled gear 27 keyed to its lower end and a spur gear 28 keyed to its upper end. Shaft 25 carries a beveled gear 30 which meshes with beveled gear 27 to drive shaft 26 which in turn rotates a turntable 32 about a vertically extending column 33. It will be noted from Figure 1 that turntable 32 is supported by a flange 34 and bearings 35. The gear 28 engages and drives a bull gear 36 mounted on the lower end of the turntable 32.

The turntable 32 supports a plurality of burner heads, two of which are indicated generally at 41 and 42. It has been found that fifteen of such heads is a satisfactory number for finishing ware at a rate in excess of sixty pieces per minute. The turntable 32 also supports a plurality of housings 44, each of which rotatably carries a resizing means which extends downwardly within the burner ring. A plurality of rods 46 and brackets 48 and 47 are provided for supporting the housings 44 and the burner heads 41 on the turntable 32.

To supply fuel to the burner heads 41, a manifold indicated generally at 52 forms a hollow annular chamber around the column 33. The manifold 52 comprises, in general, a stationary housing portion 54 supported by a stationary collar 45 which is clamped to column 33. An intake line 58 leads into the housing portion 54 of the manifold and serves to supply fuel thereto. The manifold is further provided with a rotatable distributor plate 59 which is suported by the bracket 47 and the rod 46. Fuel lines 60 communicate with the manifold through the distributor plate and lead to each of the burner heads 41.

Referring again to Figure 1, turntable 32 supports a plurality of article supporting means, one of which is indicated generally at 65. Each of the article supporting means is adapted to receive and support an article of ware 66 and to raise the ware, upon rotation of the turntable, into the heating zone of the burner head 41, and to raise the ware into contact with a resizing means, in a manner later to be described in detail.

As is best seen in Figure 1, frame 20 further includes a housing 70 which supports a suitable article transferring means indicated generally at 73, and which functions as a loading device for the turntable.

Figure 2:
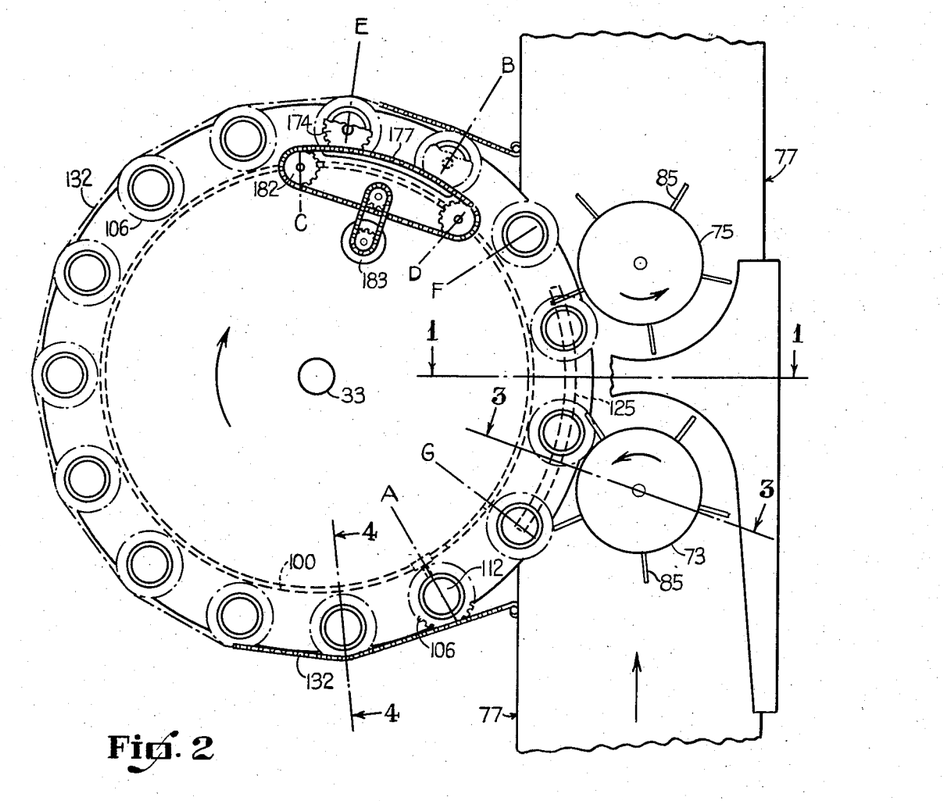
Figure 2 is a schematic plan view, partially in section, of the fire finishing machine of Figure 1. The section is taken substantially along the line 2—2 of Figure 1.

As is indicated generally in Figure 2, the machine includes a second article transferring means 75 of substantially identical construction to the article transferring means 73 shown in Figure 1. The article transferring means 73 and 75 serve as loading and unloading devices for successively transferring articles to and from a conveyor means indicated generally at 77. Hence it is seen that articles coming from the forming machine, not illustrated, are transferred to the fire finishing machine by an automatic loading device and a similar device also unloads the machine and returns the finished ware back to the conveyor 77.

As is best seen in Figure 1, the article transferring means 73 includes a vertically extending shaft 80 which includes a gear 81 on its lower end. Shaft 80 is continually driven by a suitable driving means, not illustrated, in precise timed relationship with the rotation of the turntable 32. The upper end of the article transferring means includes a head 83 and a plurality of radially extending arms 85 which are moved at a velocity equal to that of the ware progressing along the conveyor which is also the same velocity at which the article receiving fixtures 65 are rotated. Hence, as seen in Figure 2, the loading means 73 is adapted for continuous rotation to successively engage articles transported by the conveyor and to very smoothly transfer each article in an arcuate path and onto an article receiving fixture 65 which is continuously rotated with the turntable 32.

The article transferring means 73 is provided with a suitable clutch mechanism indicated generally at 88 in Figure 1. It will be noted that the clutch mechanism 88 is operatively connected between the continually driven vertical shaft 80 and the article engaging head 83 and serves to disengageably rotate the head in the manner just described. The clutch mechanism 88 is preferably of a novel construction. In general, such novel clutch mechanism permits the head 83 to cease rotation when articles are mispositioned or tumble over so as to jam the head 83. Moreover, the article transferring means 73 is adapted to automatically resume rotation due to action of clutch 88, in precise synchronization with the position of the ware on the conveyor 77 and in synchronization with the instantaneous location of the rotating article receiving means 65. That is, the article transferring means automatically resumes rotation upon removal of the articles causing the jam, and the transferring means is then automatically resynchronized thereby eliminating delays in operation and the wasting of articles which would otherwise continue to pile up at the jam.

Figure 3:
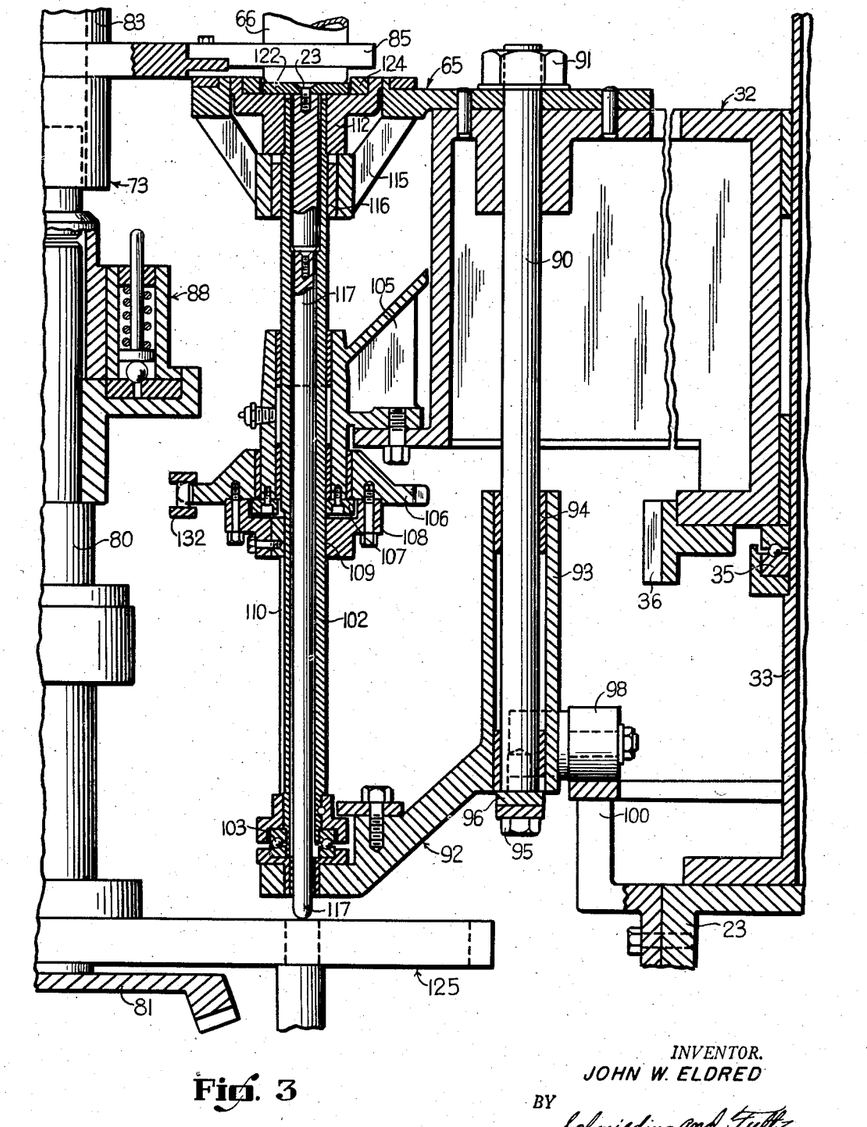
Figure 3 is a side view, partially in section, of the article receiving means utilized in the machine of the present invention. The section is taken substantially along the line 3—3 of Figure 2.

Reference is next made to Figure 3 wherein the article receiving fixtures 65 and the associated apparatus for operating same, are illustrated in an enlarged sectional view. Each of the article receiving means includes a vertical support rod 90 secured at its upper end to the turntable 32 by means of a nut 91. A casting, indicated generally at 92, is supported on the lower end of the rod 90 by means of a slideably mounted housing 93 containing bearings 94. The lower end of the rod 90 is provided with a nut 95 and washers 96 for retaining the casting on the shaft. A cam follower 98 is carried by the housing 93 and adapted to ride on a circular cam track 100. The bracket 92 supports a splined housing 102 adapted for rotation relative to the bracket 92 through the use of a bearing 103. A casting 105, carried by the turntable 32, rotatably supports a gear 106 on the flange plate 107. A gear support block 108 is bolted to the underside of gear 106 with a hole 109 through the block 108 being slotted to slideably receive the spline 110 of the housing 102. Hence it is seen that rotation of gear 106 serves to rotate the housing 102 and an article receiving fixture 112 keyed to the upper end of the housing.

At this point is should be noted that rotation of fixtures 112 commences at station A, as illustrated in Figure 2, and rotation continues until the fixtures reach station B. Between stations A and B, gears 106 are rotated by engagement with the stationary roller chain 132.

Referring next to the upper end of the housing 102, a casting 115 is secured to the turntable and provided with a bearing 116 which slideably and rotatably supports the upper end of the housing 102. Rotation of the gear 106 serves to rotate spline housing 102 and the fixture 112 for the purpose of rotating the ware when it is extended upwardly into the heating zone. It is also desirable to rotate the ware when it is extended further upwardly into engagement with the resizing means. Such rotation is effected by causing the gear 106 to engage a length of stationary roller chain 132. Since the article receiving fixture 112 is moved in a circular path as a result of rotation of the turntable 32, as soon as the gear 106 is caused to mesh with the stationary roller chain 132, at station A in Figure 2, rotation of the splined housing 102 will commence. At the same time the fixture and the ware, carried on the housing 102, will commence rotation.

It will be noted that due to the location of the roller chain 132, the ware is not rotated during the time the article receiving fixture is traveling past the article transferring means 73 and 75. Hence the fixtures 112 are both loaded and unloaded when such fixtures are not undergoing rotation. It should further be noted from Figure 2 that rotation of the fixtures 112 continues throughout most of the circular path of moment required for the fire finishing operation and the resizing operation. When the fixtures 112 reach Station B, however, the gear 106 disengages the roller chain 132 and rotation ceases. Hence the ware is stopped from rotating prior to its presentation to the unloading apparatus 75.

Referring again to Figure 3, it will be noted that the article receiving fixtures 112 comprise a ring portion 124, forming a side wall of a cup, and a bottom plate 122 which can be raised flush with the surface 124, or lowered to the cup-forming position illustrated, by means of a push-rod 117 which is slideably carried in the rotatable housing 102. Bottom plate 122 of the article receiving fixture, is raised and maintained in the flush position during the unloading and reloading operation by means of a cam 125, best seen in Figure 2, which engages the lower end of push rod 117. Hence the ware can be readily moved into position on the bottom plate 122, of the fixture 112, without being upset. The bottom plate 122 is then lowered to form a cup for maintaining the ware in position in the fixture while the fixture and ware are undergoing rotation during the fire finishing and resizing operations.

Figure 4:
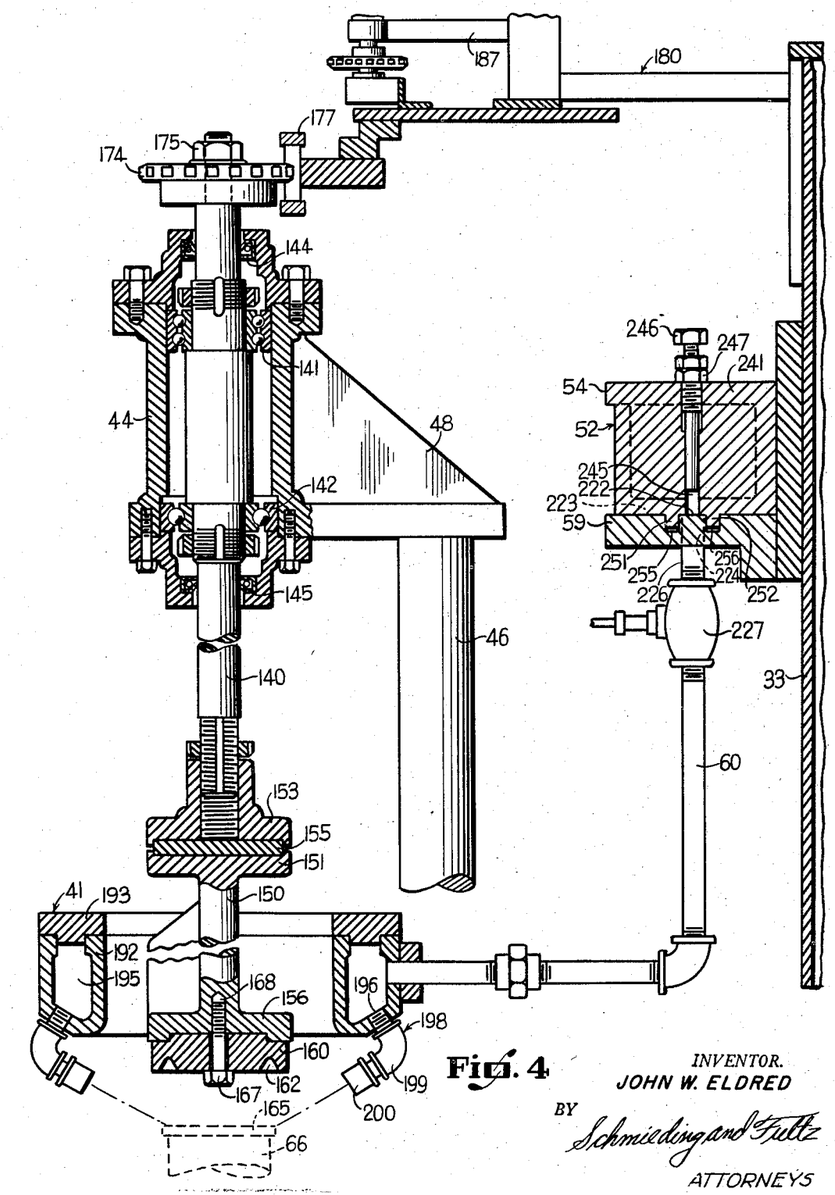
Figure 4 is a side view, partially in section, of the burner and resizing apparatus utilized in the machine of the present invention. The section is taken substantially along the line 4—4 of Figure 2.

Referring next to Figure 4, the burner head, indicated generally at 41 in Figure 1, is illustrated in enlarged relation-ship. In addition, Figure 4 illustrates an article resizing mechanism which is used in conjunction with each of the burner heads 41. This mechanism includes a housing 44, indicated generally in Figure 1, which is supported on the turntable by the bracket 48 and the rod member 46. A vertical shaft 140 is journaled for rotation in housing 44 by bearings 141 and 142. Suitable packing seals 144 and 145 are provided for retaining grease and are located at the upper and lower ends of the housing 44. A shaft 150 is coaxially disposed with the shaft 140 and provided with a flange 151 which is supported from a flange 153 which is threaded on the lower end of the shaft 140. A suitable heat insulating element 155 is interposed between flange 151 and the confronting flange 153. The heat insulated block 155 reduces heat transfer to the shaft 150 to eliminate excessive heat at the bearing portion of the shaft so that grease can be retained within the housing to provide lubrication for the bearings 141 and 142. The lower end of the shaft 150 is formed with a flange portion 156 which carries resizing die 160. Resizing die 160 is custom-made to conform with the particular article to be resized since the annular groove 162 formed in the lower surface of the resizing die 160 must be of proper diameter corresponding with the diameter of the bead 165 on the article. A machine screw 167 passes through the resizing die 160 and is threaded into the hole 168 in the shaft 150 to removeably secure the die on the shaft.

To effect rotation of the resizing die 160, the upper end of shaft 140 carries a sprocket 174 secured to the shaft by means of a nut 175. A roller chain 177 is interposed along the circular path of movement of the resizing apparatus and is intermittently engaged by the sprocket 174 for the purpose of rotating the resizing die 160 at the proper position in the cycle of rotation of the turntable as is best seen in Figure 2. To provide means for rotating the sprocket 174 in a direction opposite to its normal rotation produced by a stationary roller chain 177, the roller chain 177 is supported on sprockets 182, and driven by a motor 183 whereby the resizing die 160 can be rotated in a direction opposite to the direction such die would rotate were the roller chain 177 maintained stationary. With particular reference to Figure 2, it will be noted that the article resizing apparatus commences rotation after the ware has been fire finished, as indicated at station C in Figure 2 and when the ware arrives at station D rotation of the resizing die 160 ceases.

Shortly after rotation of the resizing die 160 commences, at the portion of cycle indicated by station E in Figure 2, the article supporting fixture 112, with the article supported thereon, is raised upwardly due to engagement of cam follower 98 with a lobe on the cam 100, and the bead 165 is caused to engage the rotating resizing die 160. After the resizing die 160 has effected its function of resizing the finish 165 on the ware 66 at station F in Figure 2, the fixture 112 is lowered responsive to the follower 98 leaving the lobe on the cam 100. Hence it is seen that after the fire finish and resizing operation, the article is lowered to the level of the unloading apparatus 75 prior to its arrival at such apparatus so that the article can be smoothly transferred back to the conveyor.

Referring again to Figure 4, the burner head 41 consists of the casing 192 provided with a cover 193 which form an annular manifold passage 195. The lower portion of the casing 192 is provided with a plurality of holes 196 each of which is provided with a burner element indicated generally at 198. Each burner element 198 comprises an elbow portion 199 and a nozzle portion 200. As is seen in Figure 4, each of the nozzles 200 is directed downwardly and radially inwardly in the direction of the bead 165 on the article 66.

Figure 5:
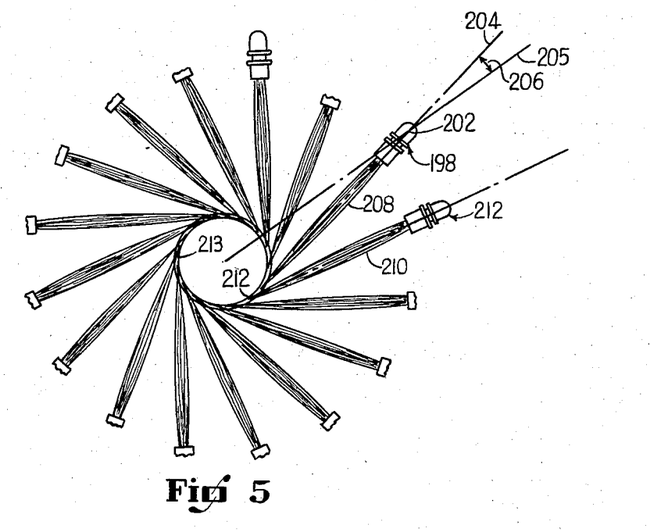
Figure 5 is a partial plan view of the burner head of the fire finishing machine which view illustrates the novel flame pattern and heating zone of the present invention.

Referring next to Figure 5 of the drawings, a partial plan view of the burner head is provided to illustrate the flame pattern and heating zone in detail. Each of the burner elements 198 can be adjusted by rotating the burner element about the axis of its threaded mounting as indicated at 202. In adjusting the burner element, the longitudinal axis 204 of the nozzle portion is disposed at an angle 206 relative to a radially extending datum line 205 as a reference. Burner element 198 is disposed at some appropriate angle 206 such that the end portion of flame 208 is caused to impinge upon the end portion of flame 210 produced by the next succeeding burner element 212. In turn burner element 212 is angularly adjusted so that its flame 210 will impinge upon the next succeeding flame. The point of impingement of the two adjacent flames 208 and 210 is indicated at 212. With this arrangement, the impinging flames will produce a substantially annular vortex of flame which forms an annular heating zone 213. It will be understood that the diameter of the vortex of flame can be adjusted to conform with the diameter of the finish of the particular article being produced and to effect such adjustment, the longitudinal axes 204 of the nozzles are inclined at an appropriate angle 206 from the radial reference line 205.

Figure 6:
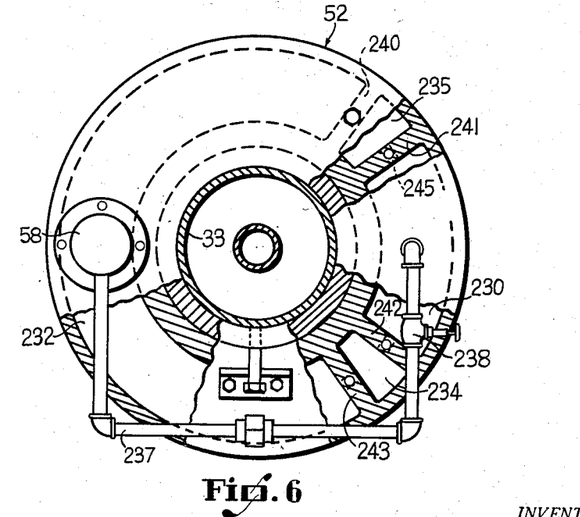
Figure 6 is a plan view of the full manifold of the present invention. This view is taken partially in section along the line 6—6 of Figure 1.

Reference is next made to the annular fuel manifold 52, best seen in the broken plan view of Figure 6. In general, this manifold is adapted to continuously supply fuel, at various rates, to each of the burner heads 41 throughout the complete cycle of rotation with the turntable. In effecting the fire finishing operation, it is necessary to supply a relatively large amount of fuel to each burner head 41 in order to produce the flame vortex heating zone 213 illustrated in Figure 5. Hence it is necessary to commence supplying a relatively large amount of fuel to each burner head when it arrives at station G in Figure 2, which is the location in the cycle at which the article is raised upwardly into the heating zone to commence the fire finishing operation. It is necessary, however, to decrease the rate of fuel supply prior to the arrival of the burner head at station E since the article is then moved upwardly such that it extends through what is normally the heating zone and into contact with the resizing die 160 in the manner previously described. It is, of course, desirable to maintain the flame, and hence the fuel supply, at a relatively low level as is indicated at 220 in Figure 1, throughout the resizing portion of the cycle.

To automatically effect the above described variations in flame intensity at the burner heads, at appropriate locations along the cycle, the burner heads are successively connected with different chambers of the manifold 52. As is best seen in Figure 4, manifold 52 comprises a stationary annular housing portion 54 which includes an annular outlet port 222 formed through its bottom wall 223. It will be noted that the housing portion 54 is mounted stationary relative to vertical column 33. A rotatable cover plate 59 is disposed over the bottom wall 223 of the annular manifold portion and in sealing relationship with the annular fuel outlet 222. A plurality of holes 224 are formed through the rotatable cover plate 59 at spaced intervals and each of the holes 224 is provided with a threaded nipple 226 which leads to a manually operated valve 227 connected to the line 60 which, in turn, leads to the burner head 41. Hence it will be understood that each of the burner heads 41 is continually in communication with the interior of the annular manifold portion 54 since holes 224 are always in communication with the annular outlet 222.

Referring next to Figure 6, it will be seen that although each of the burner heads 41 are continually in communication with the interior in the annular manifold, at certain portions of the cycle each burner head communicates only with low pressure chamber 230 which supplies fuel at a relatively low rate. At certain other portions of the cycle, however, the burner heads communicate only with a high pressure chamber 232 which supplies fuel at a relatively high rate. In making the transition between such low pressure and high pressure chambers, each burner head is caused to connect with a small chamber 234 or 235 which contains fuel at an intermediate pressure. The purpose of the intermediate pressure chambers 234 and 235 is to provide a gradual transition in the fuel pressure applied to the burners, from a relatively low rate of fuel supply to a relatively high rate of fuel supply, when the burner heads are traveling between the low pressure chamber 230 and the high pressure chamber 232. This arrangement prevents the flame from going out while the burner is negotiating the transition.

To supply fuel at appropriate pressures to the annular manifold 52 a fuel supply line 58 leads directly into the larger high pressure chamber 232 and a smaller line 237 is provided with a manually operated valve 238 which extends from the main fuel line 58 to the low pressure chamber 230. Hence it is seen that a relatively high rate of fuel discharge can be supplied to the larger chamber 232, and, at the same time, by regulating valve 238, fuel can be supplied to the smaller chamber 230 at a lower rate.

With further reference to Figure 6, the chambers are separated by means of the webs 240, 241, 242 and 243. Each of these webs includes an opening 245 which extends between the adjacent chambers separated by the web. Each web is provided with a threaded element 246 and a lock nut 247 which provide a valve for the opening 245. As is best seen in Figure 4, raising and lowering of the threaded valve member 246 will vary the size of the opening 245 and thereby control the rate of gas passage between the adjacent chambers separated by the web 241.

To effect a seal against fuel leakage between the bottom of the annular manifold portion 54 and the cover plate 59, two annular protrusions, indicated at 251 and 252 in Figure 4, are located on each side of the annular outlet passage 222 and fitted into annular grooves 255 and 256 in the upper surface of the cover plate 59.

Referring again to Figure 6, and considering same in view of Figure 2, which illustrates the various stages in the cycle of operation, it will be understood that when the turntable is rotated in a clockwise direction when viewed from the top, chamber 235 will function as a transition chamber when the fuel supply is decreased. Hence it is necessary to locate web 240, when operating in a clockwise direction, in the vicinity of station C as seen in Figure 2 so that the burner head 41 will be placed in communication with the low pressure gas of chamber 230 prior to the raising of the tumbler up through the heating zone and into contact with the finishing die 160. It will be recalled from the description of the finishing operation, that the tumbler is elevated by cam action at the station E as seen in Figure 2. Hence it is necessary to lower the flame intensity when the burner head reaches the vicinity of station C which is after the article has been fire finished and prior to the lifting of the article upwardly into engagement with the resizing die.

When the machine is operated in a counter-clockwise direction, as viewed in Figure 6, the annular manifold will function in an identical manner except that chamber 235 serves as a transition chamber when the rate of fuel supply is being increased, and chamber 234 becomes the transition chamber for effecting the decrease in rate of fuel supply.

In summary, it is seen that the present invention provides a machine for automatically fire finishing glass articles with such machine including various novel apparatus which efficiently perform successive operations on the articles. Each article is presented to an effective heating zone which is produced by a novel burner arrangement which applies heat to the finish portion of the article in a precise and uniform manner. With this arrangement, a finish of uniform size and shape is produced on the article with such finish being free of incipient checks and cracks. Moreover, in instances where more precise sizing of the finish is required, the present machine automatically effects such desired result in a novel and efficient manner. Due to the particular arrangement and location of the various components, the present machine is arranged for reverse operation whereby it can be selectively located on either side of the melting furnace and on either side of a conveyor along which the machine is operated.

Further objects and advantages of the present invention will be apparent from the preceeding description, reference being had to the accompanying drawings wherein a preferred form of embodiment is clearly shown.

I claim:

1. A machine for fire finishing glass articles comprising, in combination, a frame; supporting means carried by the frame and adapted to successively receive glass articles; article sizing means carried by the frame and adapted to engage said article; heating means carried by the frame and including an annular burner adapted to apply heat to a finish on said article, said sizing means being located above said supporting means and centrally of said annular burner; and means for moving said supporting means upwardly, subsequent to disposition of said finish in a heating zone produced by said burner, to cause said finish to engage said sizing means to effect first heating and then sizing of said article.

2. A machine for fire finishing glass articles comprising, in combination, a frame; supporting means carried by the frame and adapted to successively receive glass articles; article sizing means carried by the frame and adapted to engage said article; heating means carried by the frame and including an annular burner adapted to apply heat to a finish on said article, said sizing means being located above said supporting means and centrally of said annular burner; means for producing relative rotary motion between said supporting means and at least one of said two other mentioned means whereby a uniform effect is produced on an article by said one means and means for moving one of said two first mentioned means towards the other of said two first mentioned means to cause engagement of said finish with said sizing means.

3. In a machine for fire finishing glass articles, the combination of article supporting means; article sizing means spaced from said supporting means; means including an annular burner producing a heating zone concentrated on the finish portion of an article supported on said supporting means, said heating zone being located along a path between said supporting means and said sizing means; means for moving said first means forward said second means whereby said finish portion is caused to engage said sizing means subsequent to a predetermined heating effect being produced on said article, said movement of said first means causing portions of said article below said finish to move into said heating zone; and means for decreasing the effect of said heating zone on said path when said first means is moved forward said second means.

4. In a machine for fire finishing glass articles, the combination of article supporting means; article sizing means spaced from said supporting means; means including an annular burner producing a heating zone, said heating zone being located along a path between said supporting means and said sizing means; means for moving said first means towards said second means whereby a glass article is caused to engage said sizing means subsequent to a predetermined heating effect being produced on said article, said movement of said first means causing portions of said article below said finish to move into said heating zone; means for decreasing the effect of said heating zone on said path when said first means is moved toward said second means; and means for imparting relative rotary motion between said article supporting means and at least one of said second and third mentioned means.

5. In a machine for fire finishing glass articles, the combination of article supporting means moveable between first and second positions; means including a plurality of flame producing elements adapted to produce a heating zone substantially conforming in shape and location to the shape and location of a finish portion on an article positioned on said supporting means; sizing means conforming with said finish portion; means for moving said supporting means between said first and second positions to effect engagement between said sizing means and said finish portion subsequent to heating of said finish portion in said zone, said movement of said first means causing portions of said article below said finish to move into said heating zone; and means for decreasing the heating effect of said flame producing elements on said zone when said supporting means is moved between said first and second positions whereby said article can be disposed in said zone, without excessive heat being applied thereto during engagement between said sizing means and said finish portion.

6. A machine for fire finishing glass articles comprising, in combination, a frame; supporting means carried by the frame and adapted to successively receive glass articles, said supporting means being vertically moveable between a loading position, an article heating position, and an article sizing position; heating means carried by the frame and adapted to apply heat to a finish portion on said article; sizing means engageable with said finish portion; means for moving said article supporting means from said loading position to said article heating position to locate said finish portion of said article in a heated zone produced by said heating means; and means for moving said article supporting means between said article heating position and said article sizing position.

7. A machine for fire finishing glass articles comprising, in combination, a frame; supporting means carried by the frame and adapted to successively receive glass articles, said supporting means being vertically moveable between a loading position, an article heating position, and an article sizing position; heating means carried by the frame and adapted to apply heat to a finish portion on said article; sizing means engageable with said finish portion; means for moving said article supporting means from said loading position to said article heating position to locate said finish portion of said article in a heated zone produced by said heating means; means for imparting relative rotary motion between said two first mentioned means; and means for moving said article supporting means between said article heating position and said article sizing position.

8. A machine for fire finishing glass articles comprising, in combination, a frame; supporting means carried by the frame and adapted to successively receive glass articles; sizing means engageable with a finish portion on said articles; heating means carried by the frame and adapted to apply heat to said article, said heating means comprising a plurality of jets, the outlets of which are directed to produce impinging flames, the points of impingement of said flames defining a path corresponding to the shape of the portion of the article to be heated; said sizing means being located centrally of and above said path; means for moving said supporting means upwardly whereby said article is moved upwardly in said path and into engagement with said sizing means; and means for decreasing the heating effect of said heating means when said article is moved upwardly in said path.

9. A machine for fire finishing glass articles comprising, in combination, a frame; supporting means carried by the frame and adapted to successively receive glass articles; sizing means engageable with a finish portion on said articles; heating means carried by the frame and adapted to apply heat to said articles, said heating means comprising a plurality of spaced jets, each of which produces a flame, said jets being positioned to produce impingement of said flames, said points of impingement defining a substantially circular path, and said flames having the axes of propagation thereof inclined relative to the radii of said circular path whereby a vortex of flame is produced in said path; said sizing means being located centrally of and above said path; means for moving said supporting means upwardly whereby said article is moved upwardly in said path and into engagement with said sizing means; and means for decreasing the heating effect of said heating means when said article is moved upwardly in said path.

10. A machine for fire finishing glass articles comprising, in combination, a frame; a turntable carried by said frame supporting means carried on said turntable and adapted to successively receive glass articles; heating means for applying heat to said article; article sizing means carried by said turntable and adapted to engage said article, said article sizing means being rotatable about an axis; means for moving one of said means towards the other of said means to effect engagement of said sizing means with said article; and means carried by said frame and engageable with said article sizing means for rotating same about said axis at a certain position of rotation of said turntable.

11. A machine for fire finishing glass articles comprising, in combination, a frame; a turntable carried by said frame; supporting means carried on said turntable and adapted to successively receive glass articles; said supporting means including a follower; heating means for applying heat to said article; article sizing means carried by said turntable and adapted to engage said article, said article sizing means being rotatable about an axis; a cam carried by said frame and engaging said follower to effect engagement of said sizing means with said article; and means carried by said frame and engageable with said article sizing means for rotating same about said axes at a certain position of rotation of said turnable.

12. In a machine for fire finishing glass articles, the combination of a turntable; a plurality of article supporting elements carried on said turntable; means for transferring articles between a conveyor and said supporting elements; a second means for transferring articles between said conveyor and said supporting elements; heating means for applying heat to said article; sizing means carried by said turntable for engaging articles supported by said elements subsequent to heating of said articles, said article sizing means being rotatable about an axis; and power means for effecting rotation of said sizing means, said power means being locatable at one location along the path of article movement when said transporting means is motivated in one direction, said power means being locatable at a second location when said transporting means is motivated in the other direction.

13. In a machine for fire finishing glass articles, the combination of article transporting means; a plurality of article supporting elements carried on said transporting means, each of said elements including a follower; heating means for applying heat to said article; a sizing means for each of said supporting elements located above said elements and adapted to engage the finish on said article subsequent to the heating thereof; cam means engaging said followers for raising said elements at a predetermined position along the path of movement of said transporting means whereby said articles are caused to engage said sizing means; and means for effecting relative rotation between said elements and said sizing means when said elements are in a raised position.

14. In a machine for fire finishing glass articles, the combination of article transporting means including a plurality of article supporting elements adapted for movement along a predetermined path; flame producing means located at each of said supporting elements and adapted to heat a finish portion on said articles during movement thereof along said path; sizing means engageable with said finish portion; and means for varying the quantity of fuel supplied to said flame producing means responsive to the arrival of said supporting elements at certain predetermined locations along said path.

15. In a machine for fire finishing glass articles, the combination of article transporting means including a plurality of article supporting elements adapted for movement along a predetermined path; flame producing means located at each of said supporting elements and adapted to heat finish portions on said articles during movement thereof along said path; sizing means engageable with said finish portion; an annular manifold means including a high pressure chamber of arcuate extent greater than 180 degrees, a low pressure chamber of arcuate extent less than 180 degrees, and two intermediate pressure chambers of arcuate extent, each of said intermediate pressure chambers being located between end of said high and low pressure chambers; a passage means between each of said flame producing means and said manifold means; means for sequentially connecting said passage means with each of said plurality of chambers of said manifold means; and means for separately controlling the rate of fuel supply to a plurality of said chambers.

16. In a machine for fire finishing glass articles, the combination of article transporting means including a plurality of article supporting elements adapted for movement along a predetermined path; flame producing means located at each of said supporting elements and adapted to heat finish portions on said articles during movement thereof along said path; sizing means engageable with said finish portion; manifold means including a high pressure chamber, a low pressure chamber, and an intermediate chamber; a passage means between each of said flame producing means and said manifold means; means for sequentially connecting said passage means with each of said plurality of chambers of said manifold means; and wall means between one of said first and second chambers and said third chamber, said wall means including a passage whereby fuel supplied to said one chamber can transfer to said third chamber.

17. In a machine for fire finishing glass articles, the combination of article transporting means including a plurality of article supporting elements adapted for movement along a predetermined path; flame producing means located at each of said supporting elements and adapted to heat finish portions on said articles during movement thereof along said path; sizing means engageable with said finish portion; manifold means including a high pressure chamber, a low pressure chamber, and an intermediate chamber; a passage means between each of said flame producing means and said manifold means; means for sequentially connecting said passage means with each of said plurality of chambers of said manifold means; wall means between one of said first and second chambers and said third chamber, said wall means including a passage whereby fuel supplied to said one chamber can transfer to said third chamber; and valve means for controlling the rate of fuel transfer between said chambers.

18. A machine for fire finishing glass articles comprising, in combination, a frame; supporting means carried by the frame and adapted to successively receive glass articles; article sizing means carried by the frame and adapted to engage said article; heating means carried by the frame and adapted to apply heat to said article; a plurality of flame producing elements for said heating means arranged to direct one individual flame against another to produce a resultant flame path comprising a portion of a heating zone substantially conforming with the shape of the glass article; said sizing means being located centrally of and above said path; means for moving said supporting means upwardly whereby said article is moved upwardly in said path and into engagement with said sizing means; and means for decreasing the heating effect of said heating means when said article is moved upwardly in said path.

19. A machine for fire finishing glass articles comprising, in combination, a frame; supporting means carried by the frame and adapted to successively receive glass articles; article sizing means carried by the frame and adapted to engage said article; heating means carried by the frame and adapted to apply heat to said article; a plurality of flame producing elements for said heating means arranged to direct one individual flame against another to produce a resultant flame path comprising a portion of a heating zone substantially conforming with the shape of the glass article; means for rotating said article sizing means; said sizing means being located centrally of and above said path; means for moving said supporting means upwardly whereby said article is moved upwardly in said path and into engagement with said sizing means; and means for decreasing the heating effect of said heating means when said article is moved upwardly in said path.

20. In a machine for fire finishing glass articles, the combination of article supporting means, said supporting means being vertically moveable between a loading position, an article heating position, and an article sizing position; article sizing means spaced from said supporting means; means producing a heating zone, said heating zone being located along a path between said supporting means and said sizing means; a plurality of flame producing elements for said heating zone arranged to direct one individual flame against another to produce a resultant flame path comprising a portion of a heating zone substantially conforming with the shape of the finish portion of a glass article; and means for decreasing the heating effect of said heating zone when said article supporting means is moved from said second position to said third position.

References Cited in the file of this patent

UNITED STATES PATENTS

| | | |
|---|---|---|
| 39,357 | Reed | July 28, 1863 |
| 664,058 | Roemisch | Dec. 18, 1900 |
| 1,009,249 | Knight | Nov. 21, 1911 |
| 1,577,581 | Knight | Mar. 23, 1926 |
| 1,638,620 | Cornwell et al. | Aug. 9, 1927 |
| 1,649,641 | Zeiler | Nov. 15, 1927 |
| 1,849,823 | Cornwell et al. | Mar. 15, 1932 |
| 1,930,746 | Freese | Oct. 17, 1933 |
| 2,338,841 | Fedorchak et al. | Jan. 11, 1944 |
| 2,381,798 | Benoit | Aug. 7, 1945 |
| 2,407,878 | Greetham | Sept. 17, 1946 |
| 2,513,542 | Wahinc | July 4, 1950 |
| 2,779,134 | Gates | Jan. 29, 1957 |